US012246948B2

(12) United States Patent
Bewersdorf

(10) Patent No.: US 12,246,948 B2
(45) Date of Patent: Mar. 11, 2025

(54) METHOD FOR MOVING AN ELEVATOR CAR OF AN ELEVATOR IN ORDER TO EVACUATE PASSENGERS, AND BRAKE OPENING DEVICE FOR MOVING AN ELEVATOR CAR OF AN ELEVATOR

(71) Applicant: Inventio AG, Hergiswil (CH)

(72) Inventor: Steffen Bewersdorf, Unterägeri (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 17/757,894

(22) PCT Filed: Dec. 23, 2020

(86) PCT No.: PCT/EP2020/087819
§ 371 (c)(1),
(2) Date: Jun. 23, 2022

(87) PCT Pub. No.: WO2021/136738
PCT Pub. Date: Jul. 8, 2021

(65) Prior Publication Data

US 2023/0022982 A1 Jan. 26, 2023

(30) Foreign Application Priority Data

Dec. 31, 2019 (EP) .................................... 19220186

(51) Int. Cl.
*B66B 5/02* (2006.01)

(52) U.S. Cl.
CPC .................................... *B66B 5/027* (2013.01)

(58) Field of Classification Search
CPC .. B66B 5/027; B66B 5/02; B66B 5/18; B66B 1/32; B66B 5/04; B66B 5/16; B66B 5/044; B66B 5/028
See application file for complete search history.

(56) References Cited

FOREIGN PATENT DOCUMENTS

| | | | | | |
|---|---|---|---|---|---|
| CN | 1123246 | A | | 5/1996 | |
| CN | 1589225 | A | * | 3/2005 | ............... B66B 1/28 |
| CN | 101282899 | A | | 10/2008 | |
| CN | 103043508 | A | | 4/2013 | |
| CN | 105984775 | A | | 10/2016 | |
| EP | 3216735 | A1 | | 9/2017 | |
| EP | 3845480 | A1 | * | 7/2021 | ............. B66B 5/027 |
| EP | 3929129 | A1 | * | 12/2021 | ............... B66B 1/32 |

(Continued)

*Primary Examiner* — Jeffrey Donels
(74) *Attorney, Agent, or Firm* — William J. Clemens; Shumaker, Loop & Kendrick, LLP

(57) ABSTRACT

A method for moving an elevator car of an elevator to evacuate passengers from the elevator car in the event of a power failure, wherein a brake blocks a vertical movement of the elevator car, includes the following steps: transmitting electrical power to the brake of the elevator to release the brake and enable the vertical movement of the elevator car, the brake being moved and held in a large number of positions, ranging between a fully closed position and a fully opened position, according to the electrical power transmitted; determining an actual speed at which the elevator car is moving; comparing the actual speed with a target speed; and adjusting, in particular increasing or reducing, according to a deviation of the actual speed from the target speed, the electrical power transmitted to the brake, so that the actual speed substantially corresponds to the target speed.

15 Claims, 6 Drawing Sheets

(56) References Cited

FOREIGN PATENT DOCUMENTS

| | | | | | |
|---|---|---|---|---|---|
| JP | 2011195270 | A | * | 10/2011 | |
| KR | 20100005041 | A | * | 1/2010 | |
| WO | 2007094777 | A2 | | 8/2007 | |
| WO | WO-2008012895 | A1 | * | 1/2008 | ............... B66B 1/32 |
| WO | WO-2015093217 | A1 | * | 6/2015 | ............... B66B 1/32 |
| WO | WO-2015182446 | A1 | * | 12/2015 | ............... B66B 1/30 |
| WO | WO-2017207624 | A1 | * | 12/2017 | ............. B66B 1/308 |
| WO | WO-2020127982 | A1 | * | 6/2020 | ............. B66B 5/027 |
| WO | WO-2021136738 | A1 | * | 7/2021 | ............. B66B 5/027 |

* cited by examiner

METHOD FOR MOVING AN ELEVATOR CAR OF AN ELEVATOR IN ORDER TO EVACUATE PASSENGERS, AND BRAKE OPENING DEVICE FOR MOVING AN ELEVATOR CAR OF AN ELEVATOR

FIELD

The present invention relates to a method for moving an elevator car of an elevator in order to evacuate passengers and to a brake opening device for moving an elevator car of an elevator in order to evacuate passengers.

BACKGROUND

Methods for moving an elevator car in order to evacuate passengers from an elevator car in the event of a power failure are known. For example, EP 3 216 735 A1 describes a method in which the brake of an elevator car is gradually released after a power failure in order to move the elevator car to a floor. The electrical pulses for releasing the brake always have the same size or length of time, for example a duration of 270 ms at intervals of 1000 ms.

The disadvantage of this is that since the elevator car moves very slowly or not at all, depending on the weight ratios between the counterweight and the elevator car containing persons, a large number of electrical pulses are necessary to move the elevator car significantly. It can therefore take a very long time until the elevator car has been moved to a height at which the passengers can leave the elevator car. Another disadvantage is that with such a method, if there are large differences in weight, the elevator system can reach a high speed within the time period and must be decelerated and brought to a standstill at the end of the time period. This leads to jerky movements that unsettle the passengers and possibly even endanger them.

SUMMARY

There may be a need, inter alia, for a method for moving an elevator car of an elevator in order to evacuate passengers and for a brake opening device for moving an elevator car of an elevator in order to evacuate passengers in the event of a power failure, in which method and for which device the elevator car is moved at a constant speed to the next floor.

Such a need can be met by a method for moving an elevator car of an elevator in order to evacuate passengers and by a brake opening device for moving and for evacuating passengers according to the advantageous embodiments that are defined in the following description.

According to a first aspect of the invention, a method for moving an elevator car of an elevator in order to evacuate passengers from the elevator car of the elevator in the event of a power failure, by a brake blocking a vertical movement of the elevator car, is provided, the method comprising the following steps:

transmitting electrical power to the brake of the elevator to release the brake and enable the vertical movement of the elevator car, it being possible for the brake to be moved and held in a large number of positions, ranging between a fully closed position and a fully open position, according to the electrical power transmitted;

determining an actual speed at which the elevator car is moving;

comparing the actual speed with a target speed; and adjusting, in particular increasing or reducing, according to a deviation of the actual speed from the target speed, the electrical power transmitted to the brake, so that the actual speed substantially corresponds to the target speed.

The advantage of this is that the electrical power transmitted to the brake depends on an actual speed and a target speed. The power transmitted to the brake determines the state, i.e., the position of the brake shoe and thus the braking force that the brake exerts on an object to be braked. If sufficient electrical power is transmitted to the brake, the brake opens from a closed position to an open position. On the way from the closed position to the open position, a large number of intermediate positions are passed through, i.e., the brake shoes are located in different positions in which they are in contact with the brake disk or the shaft to different extents and therefore brake to different extents. In the closed position, the brake shoes press so hard against the object to be braked that the elevator does not perform any vertical movement even when loaded at nominal load. In the open state, the brake shoes are completely detached from the object to be braked, so even a small difference in weight between the elevator car and the counterweight will cause the elevator to move under the action of gravitational force. By adjusting the electrical power, the positions can be used to regulate the speed of the elevator during evacuation. If a target speed is not reached, the brake can be moved to an intermediate position which is closer to the fully open position and held there, as a result of which the braking effect decreases and the speed increases. If a target speed is exceeded, the brake can be moved from the current position in the direction opposite to the aforementioned direction and held in an intermediate position which is closer to the fully closed state, as a result of which the braking effect is increased and the speed of the elevator installation is reduced. The braking effect is strongest in the fully closed position. The braking effect decreases with each position closer to the fully open position (no dragging). If the power supplied to the brake is now controlled according to the speed, the speed can be adjusted independently (at least within a certain weight range) of the weight difference in the elevator system.

The method mentioned can therefore be used to evacuate the elevator car, in which evacuation the elevator car is moved substantially at a constant speed, and a feeling of comfort and safety can thus be generated among the passengers in the elevator car, in contrast to the evacuation methods in which abrupt deceleration processes take place in small increments. Furthermore, the elevator car can be evacuated without long waiting times, i.e., in a short time, without exposing passengers to a high level of risk, since the service technician starts the method by pressing a button and can then be sure that the car is moved at a speed that is controlled and in particular is not too high. The large number of acceleration/braking processes that are common in the known methods are avoided without endangering the safety of the passengers.

According to a second aspect of the invention, a brake opening device for moving an elevator car of an elevator in order to evacuate passengers from the elevator car of the elevator in the event of a power failure, in which a brake blocks a vertical movement of the elevator car, is provided, the brake opening device comprising the following: an electrical energy source for supplying the brake with energy; a semiconductor switch, in particular an IGBT (insulated-gate bipolar transistor), for connecting the brake to the energy source; and a control device for controlling the switch.

Possible advantages of the brake opening device correspond analogously to the above-described advantages of the method specified above.

According to a third aspect of the invention, an elevator for passengers is provided, the elevator comprising an elevator car for accommodating the passengers and a brake opening device as described above and in the following.

Possible features and advantages of embodiments of the invention may, inter alia and without limiting the invention, be dependent upon the concepts and findings described below.

As already stated at the outset, in the event of a power failure, passengers have to be evacuated from the elevator car of an elevator. In the event of a power failure, the elevator car is often not at a height along the elevator shaft at which the passengers can safely leave the elevator car after opening the door or doors of the elevator car.

In the event of a power failure, the elevator car is usually decelerated or blocked by brakes which are normally closed, so that vertical movement along the elevator shaft is not possible as long as the brake is closed. In order to move the elevator car, in the known method the brake is released by applying an electrical pulse to the brake once or several times, which fully opens the brake. During the electrical pulse, the brake typically remains in the fully open state, so that the elevator car can move freely, i.e., without the action of the brake. In the prior art, the lengths of the electrical pulses are the same, i.e., each electrical pulse has the same length. During the particular electrical pulse, the elevator car begins to move, and in some circumstances moves very slowly, so that the movement in height or the distance covered in height per electrical pulse is only very small. In other cases, the car may be moving at a very high speed and then at the end of the electrical pulse must be decelerated sharply in order to be brought to a standstill. The elevator car experiences abrupt deceleration. Whether the car moves very slowly or quickly depends exclusively on the weight ratios between the elevator car and the counterweight. The possibly abrupt decelerations can put a lot of stress on the passengers in the elevator car.

The above-mentioned problems or shortcomings in conventional approaches are addressed by embodiments of the method presented herein for moving an elevator car of an elevator in order to evacuate passengers from the elevator car of the elevator and of the brake opening device described herein for moving an elevator car of an elevator in order to evacuate passengers from the elevator car of the elevator.

With the method presented herein and the brake opening device presented herein, the electrical power applied to the brake is adjusted in such a way that the elevator car continues to travel at a target speed after it has reached this target speed. Evacuation is thus achieved in which the speed of the elevator car is substantially constant after a target speed has been reached. The electrical power transmitted to the brake is controlled in a substantially closed-loop manner so that the actual speed corresponds to a target speed.

If the actual speed is higher than the target speed, the brake, as a result of reducing the electrical power and under the action of the springs, which completely closes the brake in the de-energized state, is moved toward the fully closed position, so that the brake shoes drag more against the object to be braked. This results in an increased braking effect. The actual speed of the elevator system decreases and therefore approaches the target speed. If the actual speed is lower than the target speed, the electrical power transmitted to the brake is increased, so that the brake opens further, i.e., moves toward the fully open position, so that the dragging action of the brake shoes on the object to be braked decreases and the elevator system can move faster with a low level of braking resistance.

According to one embodiment of the method, the transmitted electrical power is also adjusted by opening or closing a switch that connects the brake to an electrical energy source. In other words, in this embodiment, the electrical power can be controlled by continuously turning the switch on and off. If the switch is switched on, the brake, in particular the electromechanical actuator of the brake, is electrically connected to the energy source, so that a current is established from the energy source to the brake. By turning the switch on and off, this current, and thus the electrical power transmitted to the brake, is modulated.

This makes it possible in a simple manner for the brake to assume any number of intermediate positions between the two end positions (completely closed and completely open). In these intermediate positions, the dragging force of the brake pads changes, so that depending on the intermediate position imparted, a smaller or larger braking effect occurs. With a corresponding control of the switch it can thus be achieved that the elevator car moves at a constant speed, specifically the target speed.

According to one embodiment of the method, the electrical power is also transmitted to the brake in the form of an electrical pulse, the transmitted electrical power being adjusted by increasing or decreasing a pulse width and/or pulse amplitude and/or pulse frequency of the electrical pulse.

The open state of the brake can thus be adjusted by a combination of one or more of the parameters mentioned above. Controlling the pulse width and/or pulse amplitude and/or pulse frequency provides a simple way to adjust the power transmitted to the brake. In this context, the pulse width can be understood to be the length of a pulse, that is to say the period of time in which a certain voltage is applied to the brake. For a voltage pulse, the pulse amplitude is the voltage value (in volts). The pulse frequency can be understood to be the reciprocal of the period in which a pulse is repeated.

According to one embodiment of the method, the electrical pulse is a voltage pulse, in particular a DC voltage pulse.

In this embodiment, therefore, a DC voltage is applied to the brake during the duty cycle of the pulse. After the pulse duration, the voltage is reduced to zero, i.e., no more voltage is applied to the brake. The voltage that the brake sees thus varies between a zero level and a fixed DC value. This makes it possible for the method to be carried out in a particularly simple manner. It is possible to switch back and forth between two voltage levels merely using a switch.

According to one embodiment of the method, the electrical pulse is a rectangular pulse.

It has proven to be advantageous that a rectangular pulse can be generated in a particularly simple manner and with very few resources, i.e., particularly inexpensively.

According to one embodiment of the method, the method starts when a switch is actuated.

The evacuation can be started by a service technician who actuates a switch. This makes it possible for the service technician to start the evacuation process only when the system is in a safe state that allows evacuation.

According to one embodiment of the method, the method steps are repeated during actuation of a switch.

A switch must therefore be constantly pressed in order to carry out the method. This has the advantage that the evacuation can only be carried out under the supervision of a service technician. The technician must actuate the switch throughout the on-site method. A safety element is built into the evacuation, thus allowing safe evacuation.

According to one embodiment of the method, the method is ended as soon as the car reaches a floor.

It has proven to be advantageous that the method is automatically stopped when a floor, on which the passengers can be evacuated, is reached. This makes it impossible for the evacuation operation to be continued beyond reaching the floor. This makes it impossible to miss the floor during evacuation operations. This simplifies the evacuation process.

According to one embodiment of the method, the transmission of the electrical power to the brake is stopped when a speed limit is exceeded, so that the brake is closed.

Such a method has an additional safety function in that the method is automatically ended if it is detected that the speed is too high. Since the actual speed has to be measured at regular intervals for the method, such a safety function can be implemented without great additional effort. In this way, a safe method is achieved that can be implemented easily.

According to one embodiment of the method, the transmission of the electrical power to the brake is stopped when the speed falls below a speed limit, so that the brake is closed.

It has proven to be advantageous that such evacuation is automatically stopped if, due to the weight ratios between the elevator car and the counterweight being too balanced, evacuation would only be possible with very long waiting times. This makes it possible to evacuate the elevator car in a different way after the method has been interrupted. Furthermore, the end of the method makes it clear to the service technician that an unfavorable weight ratio is present in the system, without the service technician having to look down the shaft and identify and assess the speed of the elevator car.

According to one embodiment of the brake opening device, it comprises an electrical energy source for supplying the brake with energy, a semiconductor switch, in particular an IGBT, for connecting the brake to the electrical energy source, and a control device for controlling the switch.

The inertia that is present in electromechanical or mechanical switches does not exist in semiconductor switches, so that the modulation of the energy supply by a semiconductor switch is substantially steplessly adjustable. In electromechanical or mechanical switches, due to the mechanical and electrical inertia and the resulting limitation of the number of switching cycles per time unit, only stepwise regulation of the energy supply is possible due to the design. The use of an IGBT, in contrast, allows the position of the brake shoes to be regulated substantially steplessly and the brake to be held in these positions. In the method according to the invention, it is possible to set a constant speed more precisely during the evacuation, i.e., without the comparatively large oscillations around the target speed which are necessarily present in electromechanical or mechanical switches due to inertia. In particular, this reduces wear on the brake and on the other components involved in setting the brake position.

In other words, the brake opening device in this embodiment can connect/disconnect the brake to/from the energy source at a high frequency due to the presence of a semiconductor switch and a control device for controlling this semiconductor switch. The flow of energy into the brake can thus be modulated by the switch-on behavior of the switch. This allows the holding position of the brake to be set precisely using the brake opening device according to the invention. In contrast to a conventional switch, a semiconductor switch allows higher switching frequencies, which makes it possible to modulate the transmitted power to achieve a large number of different braking positions in which the brake exerts different braking effects on the object to be braked, as described above.

In this way, it can generally be ensured in a technically simple manner that the braking resistance of the brake, which the brake exerts on the object to be braked, can be finely adjusted by controlling the position of the brake shoes. By finely adjusting the braking position and thus the braking effect, it can be ensured in a technically simple manner that the elevator car does not reach or exceed a speed that is too high. It can also be ensured that the speed of the elevator car is kept substantially constant during the evacuation. Constant in this context is understood to mean that after an acceleration phase, the elevator car is moved at a substantially constant speed until a deceleration phase is initiated shortly before reaching the next floor, in which deceleration phase the car is brought from the substantially constant speed to zero-speed, i.e., to a stop. Among other things, this prevents the elevator car from being at too high a speed and having to be decelerated abruptly, which leads to high negative accelerations and thus to the risk of injury to the passengers in the elevator car. In addition to the risk of injury, abrupt deceleration of the elevator car also reduces the comfort of the passengers in the elevator car. Another advantage of this embodiment of the brake opening device is that the brakes for braking the elevator car are usually spared, since the forces that occur when braking the elevator car can be kept particularly low.

According to one embodiment of the brake opening device, the device further comprises a speed determination device for determining a speed of an elevator car.

The presence of a speed determination device makes it possible for the brake opening device to control the speed in a closed loop. The brake opening device can thus keep the speed of the elevator car substantially constant during the evacuation process.

According to one embodiment of the brake opening device, the speed determination device comprises a magnetic reading device on the elevator car and a magnetic tape in the shaft.

In other words, the speed is determined by the speed determination device, that is to say by the magnetic reading device, which reads out a magnetic field pattern along a magnetic tape.

It has proven to be advantageous that a magnetic reading device is often already present in the elevator car and a magnetic tape is often already present in the elevator installation. The brake opening device can thus determine the speed of the elevator car without a separate speed determination device being required exclusively for the brake opening device. This leads to a cost-effective design of the brake opening device.

According to one embodiment of the brake opening device, the speed determination device comprises an encoder on the machine of the elevator. The speed of the elevator car can be deduced from the rotational speed of the shaft of the machine.

According to a further aspect of the invention, the advantages mentioned above and below are also achieved by an elevator for passengers, the elevator comprising an elevator car for accommodating the passengers and a braking device, as described above and below.

According to a further aspect of the invention, the advantages as described above and below are also achieved by using a semiconductor switch to modulate a voltage applied to an elevator brake, so that an elevator car moves at a substantially constant speed.

It should be noted that some of the possible features and advantages of the invention are described herein with reference to various embodiments of the method for moving an elevator car of an elevator in order to evacuate passengers from the elevator car of the elevator and of the brake opening device for moving an elevator car of an elevator in order to evacuate passengers from the elevator car of the elevator. A person skilled in the art will recognize that the features can be suitably combined, adapted or replaced in order to arrive at further embodiments of the invention.

Embodiments of the invention will be described in the following with reference to the accompanying drawings, although neither the drawings nor the description should be construed as limiting the invention.

DETAILED DESCRIPTION

Figure 1:
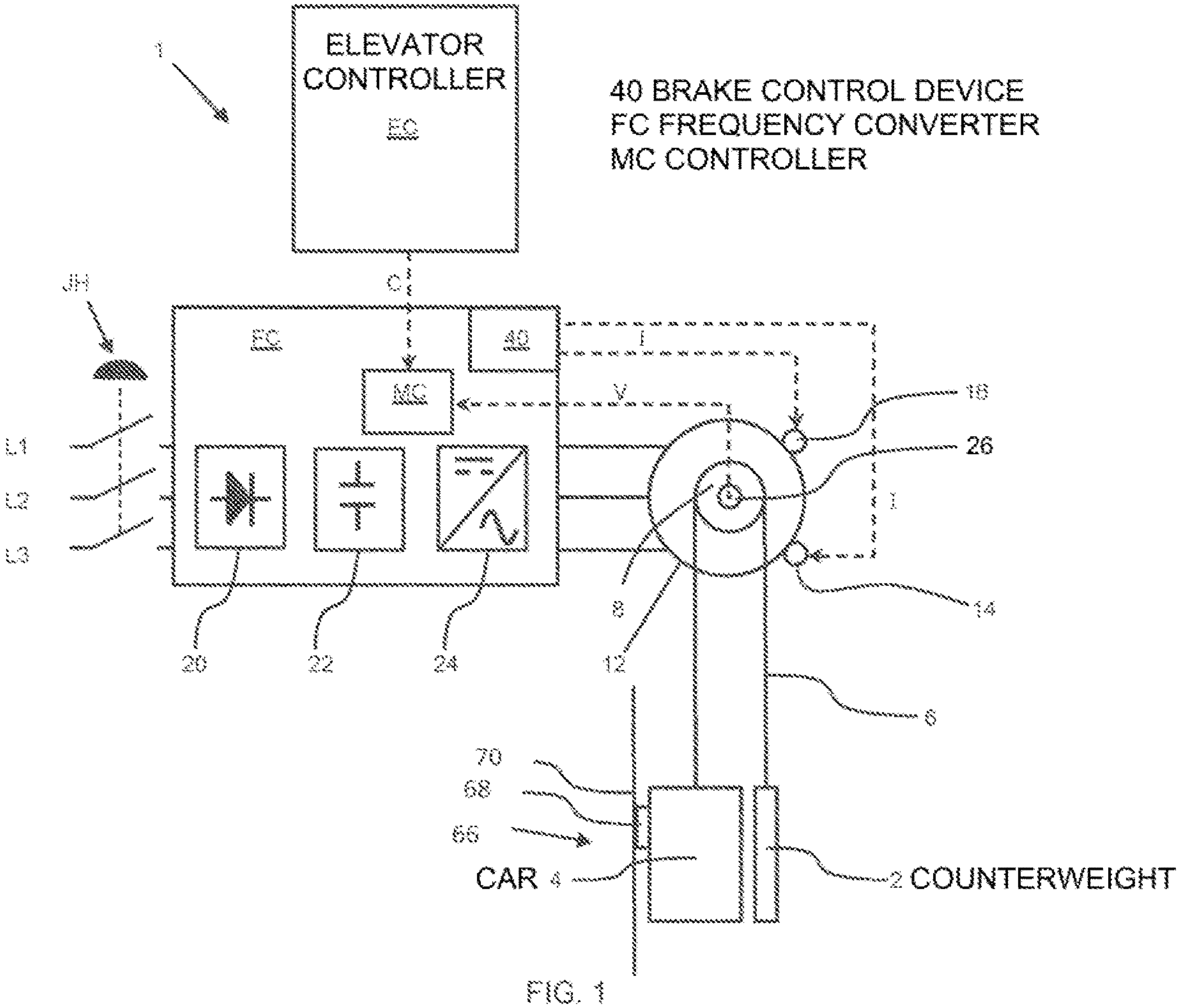
FIG. 1 is a schematic representation of a typical elevator installation.

FIG. 1 shows an elevator installation with which the method according to the invention and the device according to the invention can be used. The elevator 1 moves in a shaft and comprises a counterweight 2 and an elevator car 4 which move in opposite directions along guide rails. Suitable suspension means 6, such as belts or ropes, connect the counterweight 2 and the elevator car 4. The suspension means 6 are connected to the counterweight 2 at one end, run over a traction sheave 8 which is located in the upper region of the shaft, and are connected to the elevator car 4 at the other end.

The drive sheave 8 is driven by the motor 12 via a shaft and is braked by the brakes 14, 16. The use of at least two brakes is required (e.g., by EN81-1:1998). Accordingly, the embodiment has two independent electromechanical brakes 14 and 16 which act on the shaft of the motor 12 via a brake disk. As an alternative to the brake disks, the brakes could act on a brake drum, as described in WO 2007/094777 A2.

Electrical energy comes from the main energy supply and is fed through the main contacts of the circuit breaker JH in three phases L1, L2 and L3 via the frequency converter FC to the motor 12. The frequency converter FC has a rectifier 20 which converts the AC voltage from the main energy supply into a DC voltage in the DC link 22. The DC voltage in the DC link 22 acts as an input for the converter 24, which converts the DC voltage into an AC voltage for powering the motor 12. The inverter 24 comprises a large number of power semiconductors, such as IGBTs, which are controlled by a PWM signal from the motor controller MC.

The mode of operation of the elevator 1 is controlled by an elevator controller EC. The elevator controller EC receives calls from the passengers, which they enter via the call panels on the respective floors. Before a call is processed by the elevator installation, a brake control device 40, which in this embodiment is designed as part of the frequency converter FC, will generate a current signal I to release the brakes 14, 16. The movement of the motor 12 is monitored by an encoder 26 in this embodiment. The encoder 26 is mounted on the traction sheave 8 or directly on the motor shaft and functions as a speed determination device. A speed signal V from the encoder 26 is fed back to the controller MC in the frequency converter FC. The unit MC can thus determine parameters such as the position, speed and acceleration of the elevator car 4. In addition or as an alternative, a magnetic tape 70 can be installed in the shaft and a magnetic reading device 68 can be installed on the elevator car 4 to function as a speed determination device 66. The magnetic reader 68 on the elevator car 4 runs along the magnetic tape 70 during a vertical movement. Due to the design of the magnetic tape having different magnetic zones, the magnetic reading device can determine the movement of the elevator car 4 in the shaft and parameters such as the speed, and acceleration can be derived.

Although the brake controller 40 is shown in FIG. 1 as part of the frequency converter FC, it is clear to a person skilled in the art that the brake controller 40 can also be formed in a separate housing outside the frequency converter FC or as part of the elevator controller EC.

Figure 2:
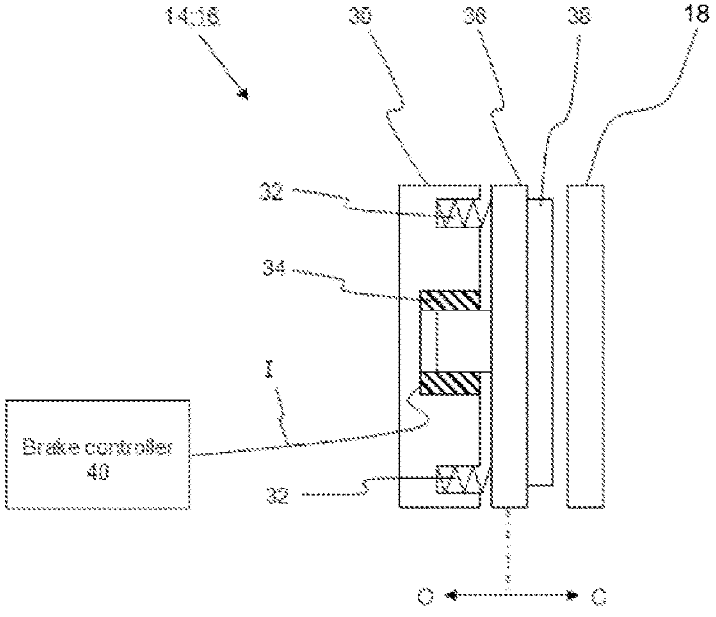
FIG. 2 is a schematic of the main components of the electromechanical brake from FIG. 1.

FIG. 2 is a schematic representation of the main components of the electromechanical brakes 14 and 16 from FIG. 1. Each of the brakes 14, 16 is connected by a cable to a brake controller 40 and comprises an actuator 30 and an armature 36 on which a brake pad 38 is mounted.

The actuator 30 includes one or more springs 32 arranged to push the armature 36 in a brake closing direction C when braking. The armature 36 is thus biased in a direction C toward the brake disk 18. In addition, the brake comprises a brake coil 34 mounted in the actuator 30. The coil 34 exerts an electromagnetic force on the armature 36 in the brake opening direction O against the spring force of the springs 32 when the coil is energized and thus moves the armature 36 away from the brake disk 18 and thus opens the brake.

Figure 3:
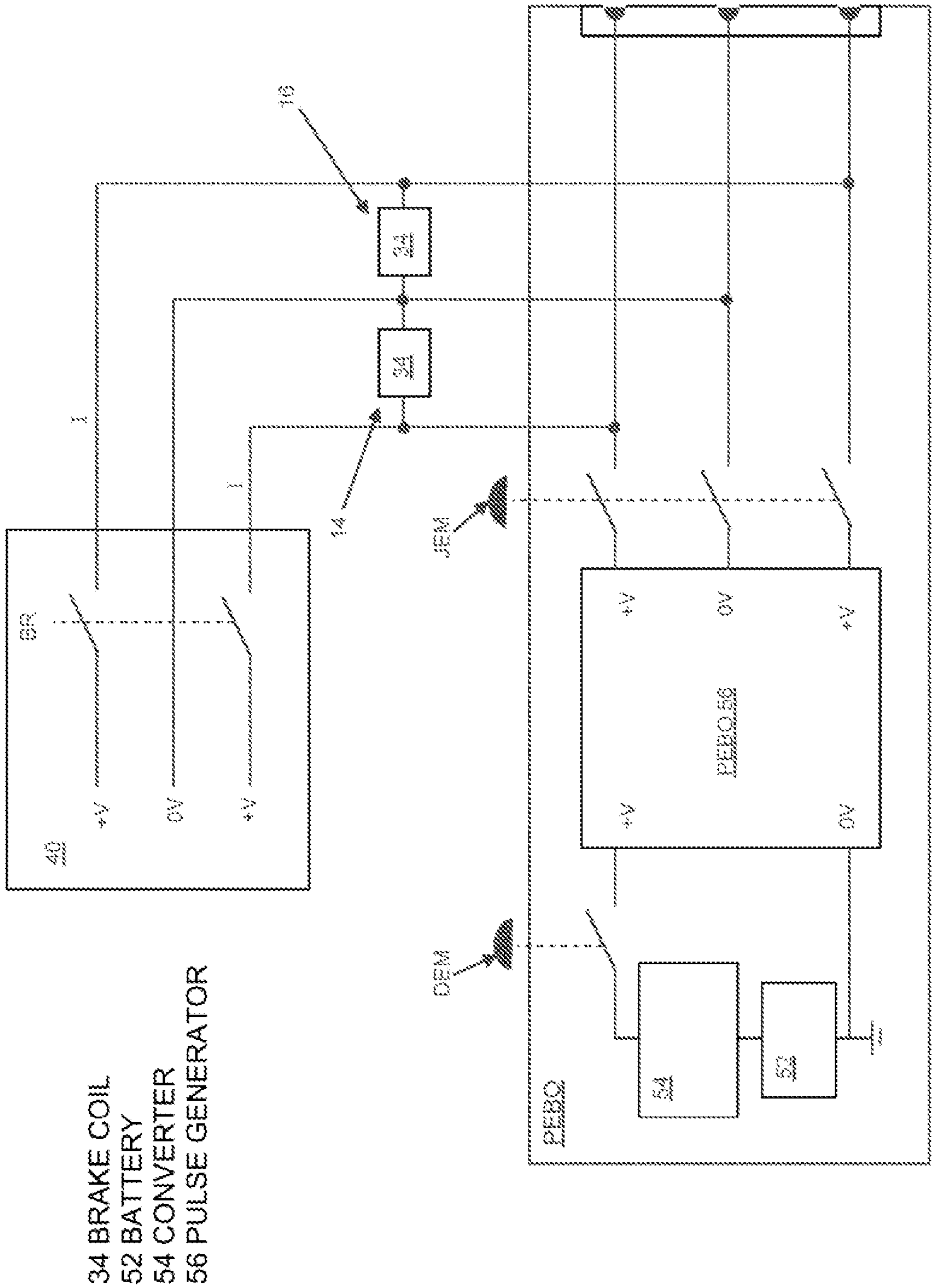
FIG. 3 (Prior Art)
FIG. 3 is a schematic representation of a control device for controlling the brake from FIGS. 1 and 2, comprising a brake opening device known from the prior art.

FIG. 3 is a schematic representation of a brake control device 40 of FIGS. 1 and 2 in combination with a pulse generator (PEBO) known from the prior art. In normal operation of the elevator 1, when sufficient energy is available in the main energy supply, a DC voltage from the main energy supply is selectively fed to the coil 34 through the brake contact or brake relay BR, as shown schematically. In normal operation, the brakes 14, 16 are open when the brake relay BR is closed and thus a current I flows from the positive output +V through the coil 34 to the brakes 14, 16 and toward the ground connection 0V. When the brake relay BR is open, the brake coils 34 are simultaneously disconnected from the energy supply and the springs 32 move the armature 36 in direction C such that the brake pads 38 come into contact with the brake disk 18 and the brakes block movement of the elevator system.

For ease of use, the device PEBO comprises an independent energy supply, in this case a battery 52, which provides the electrical power for the pulse generator 56. A converter 54 can optionally be present which adapts the voltage level of the battery 52 to the required voltage level of the generator 56. The pulse generator 56 can thus supply appropriate pulses to the coils 34 of the brakes 14, 16.

Figure 4:
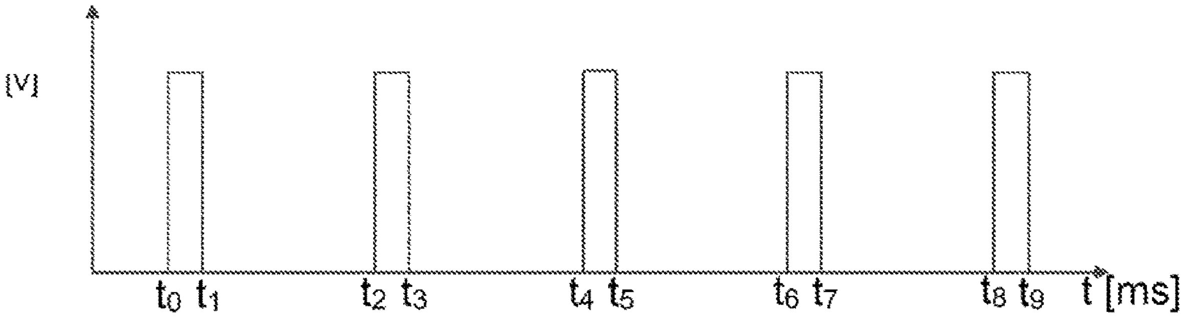
FIG. 4 (Prior Art)
FIG. 4 is a schematic representation of output pulses of the brake opening device from FIG. 3.
Figure 5:
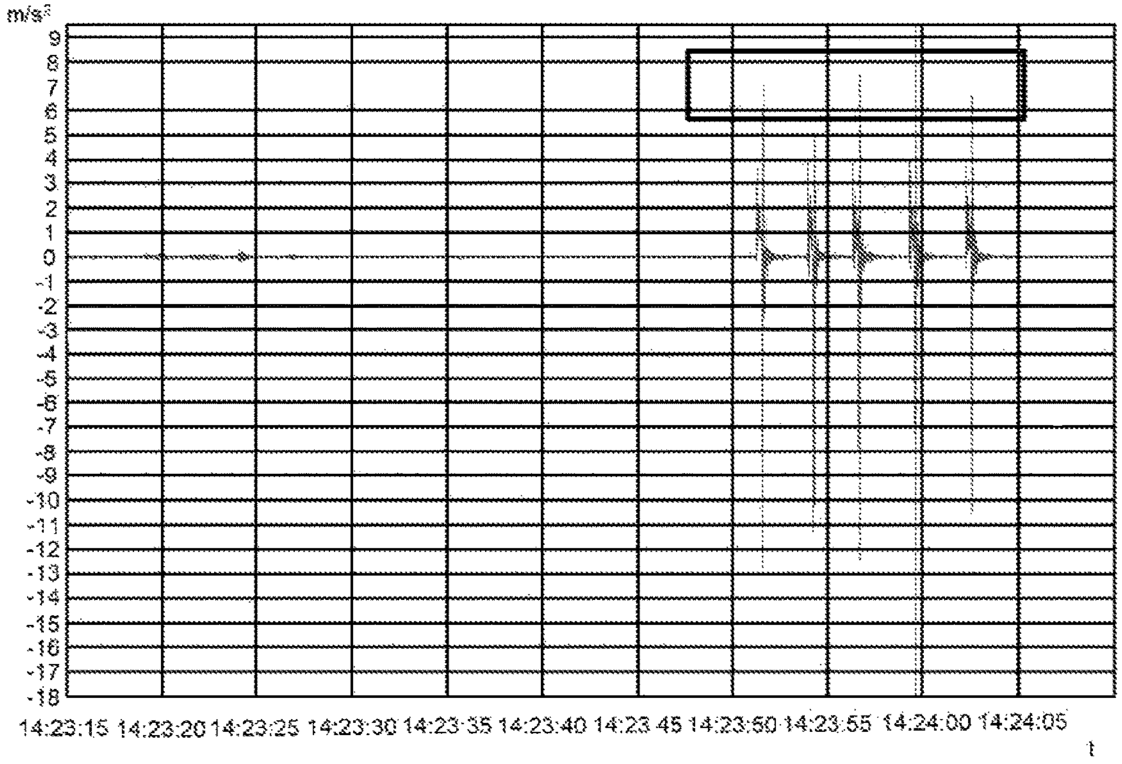
FIG. 5 (Prior Art)
FIG. 5 is a schematic representation of jerky movements in the elevator car during the opening process of the brake opening device, as shown in FIG. 4.

In order to carry out manual evacuation of the elevator car 4 in the event of a power failure, the relevant personnel must first turn off the main energy supply switch JH (see FIG. 1) upon arrival at the control facility to ensure that the evacuation procedure is not interrupted even if the main energy supply is operational again. The manual evacuation switch JEM of the device PEBO can then be switched on and thus an electrical connection can be established between the generator 56 and the brake coils 34. Another manual evacuation switch DEM is then actuated so that the pulse generator 56 and the battery 52 are connected to one another. The generator 56 will then deliver a series of electrical pulses to the brake coils 34, as shown in FIG. 4. For each of the braking pulses, the brake opens and the elevator car 4 can move, under the influence of gravitational force and in the presence of an imbalance between the mass of the elevator car 4 and the counterweight 2, in a manner corresponding to the imbalance. The manual evacuation switch DEM can be repeatedly pressed until the elevator car 4 arrives at a floor. In this method according to the prior art, it takes a plurality of pulses to move the car and thus a plurality of actuations of the switch DEM. The duration of a pulse, i.e., from time $t_0$ to time $t_1$, is always the same length and is 72 ms, for example. The jerky movements triggered by these pulses can be measured by a sensor in the elevator car 4 and are shown schematically in FIG. 5.

Figure 6:
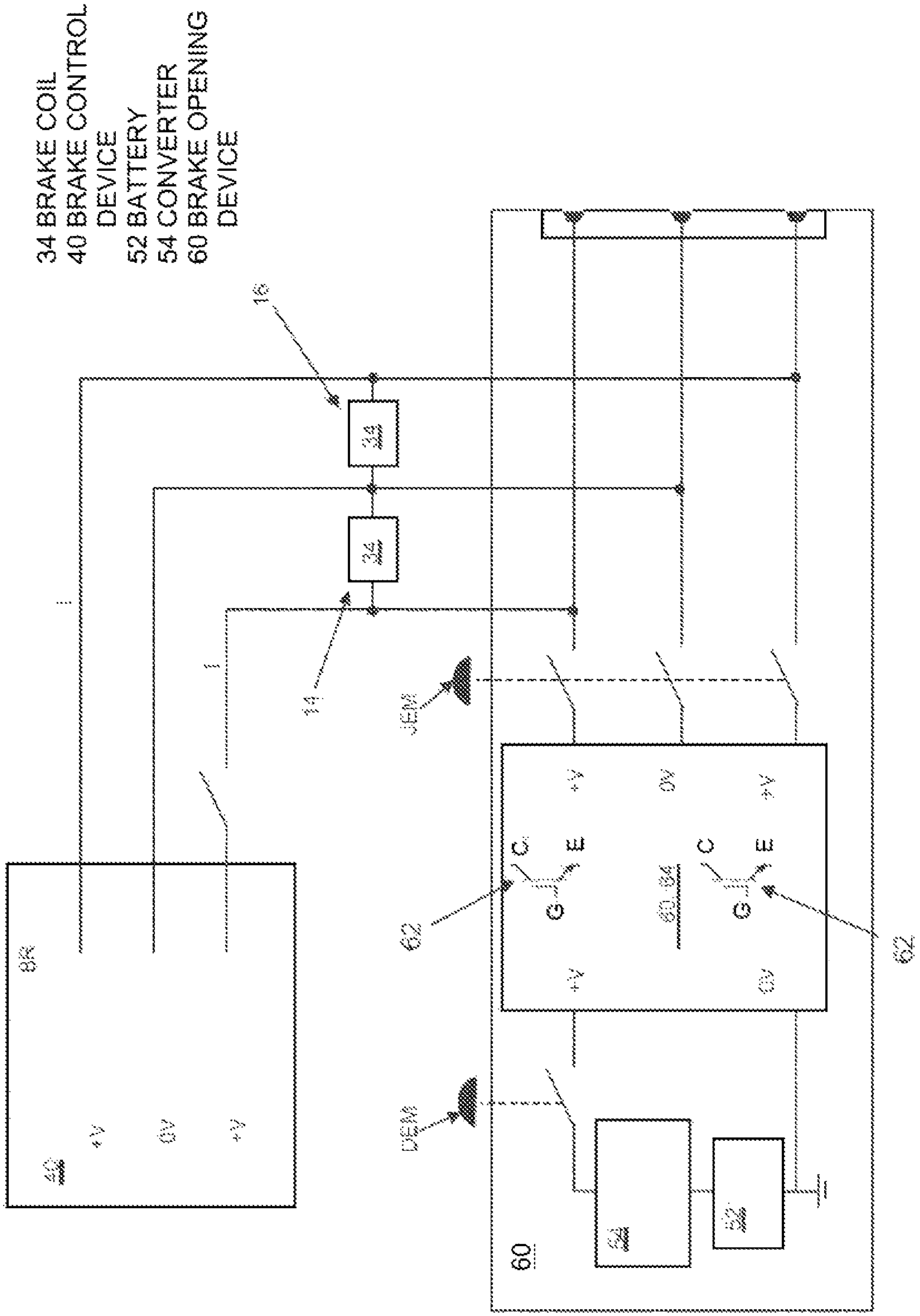
FIG. 6 schematically shows a brake opening device according to the invention in accordance with an embodiment of the invention.
Figure 8:
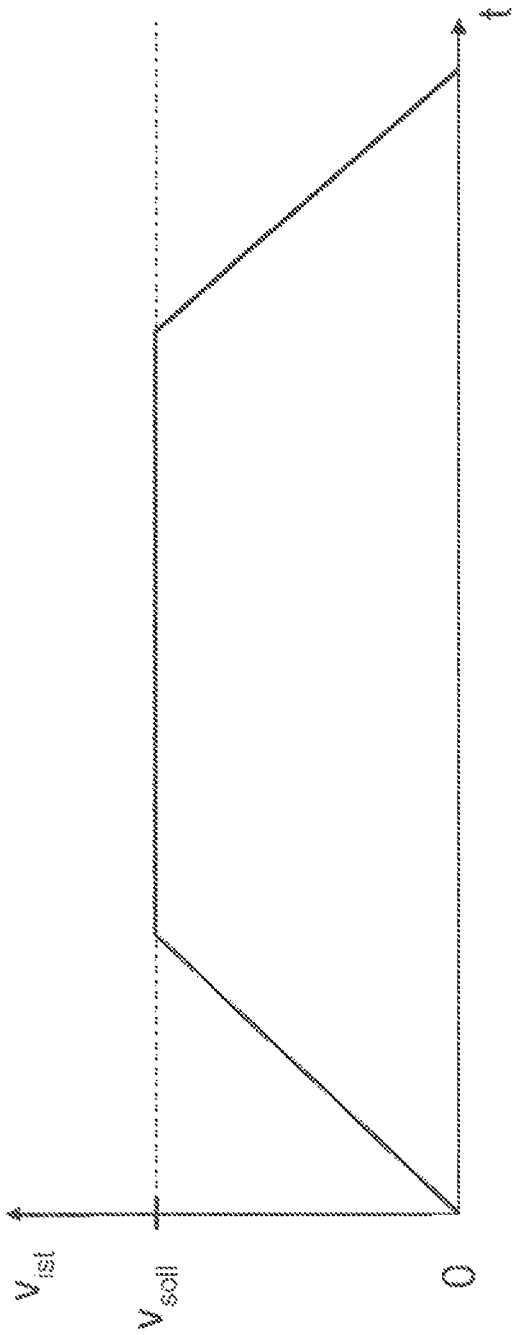
FIG. 8 shows a speed profile of an evacuation process which is carried out by the method according to the invention.

FIG. 6 shows a brake opening device 60 according to the invention instead of the device PEBO. The components already shown in FIG. 3 and previously described are identified by the same reference numbers and will not be described again, reference being made to the previous description. In contrast to the pulse generator 56 in the device PEBO, the brake opening device 60 according to the invention comprises a control device 64 having two switches 62, which in this embodiment are in the form of semiconductor switches, specifically in the form of IGBTs. The semiconductor switches are arranged in the electrical path from the battery 52 to the brakes 14 and 16 at the positive pole of the battery, which is routed to the coils 34 via two lines. In addition to the switches DEM and JEM, the switches 62 thus make it possible for the energy supply from the battery to the brakes 14, 16 to be interrupted. If the two switches DEM and JEM are closed, the energy flow from the battery 52 to the brakes 14 and 16 can be modulated via the switch 62. For this purpose, the semiconductor switches can be switched on and off at a high frequency, it being possible for the power actually transmitted from the battery to the brakes 14, 16, in particular to the coils 34 of the brakes, to be set via the on and off duration. Due to the presence of a switch 62 for each of the brakes 14 and 16, each of the brakes can be activated individually. The activation makes it possible to regulate the brake in such a way that it brakes the elevator system so that, at a given imbalance between the elevator car and the counterweight, a substantially constant speed is set in the elevator system. The brake opening device according to the invention thus enables an evacuation process in which the elevator car is moved at a substantially constant speed. The jerky movements from FIG. 5 can be at least partially eliminated. The movement takes place continuously. The movement includes an acceleration phase in which the speed is accelerated from zero to the specified target speed, then a movement phase in which the elevator car moves at a constant speed, and finally a braking phase in which the elevator car is decelerated below the target speed to a standstill. These speed profiles are shown in FIG. 8.

Figure 7:
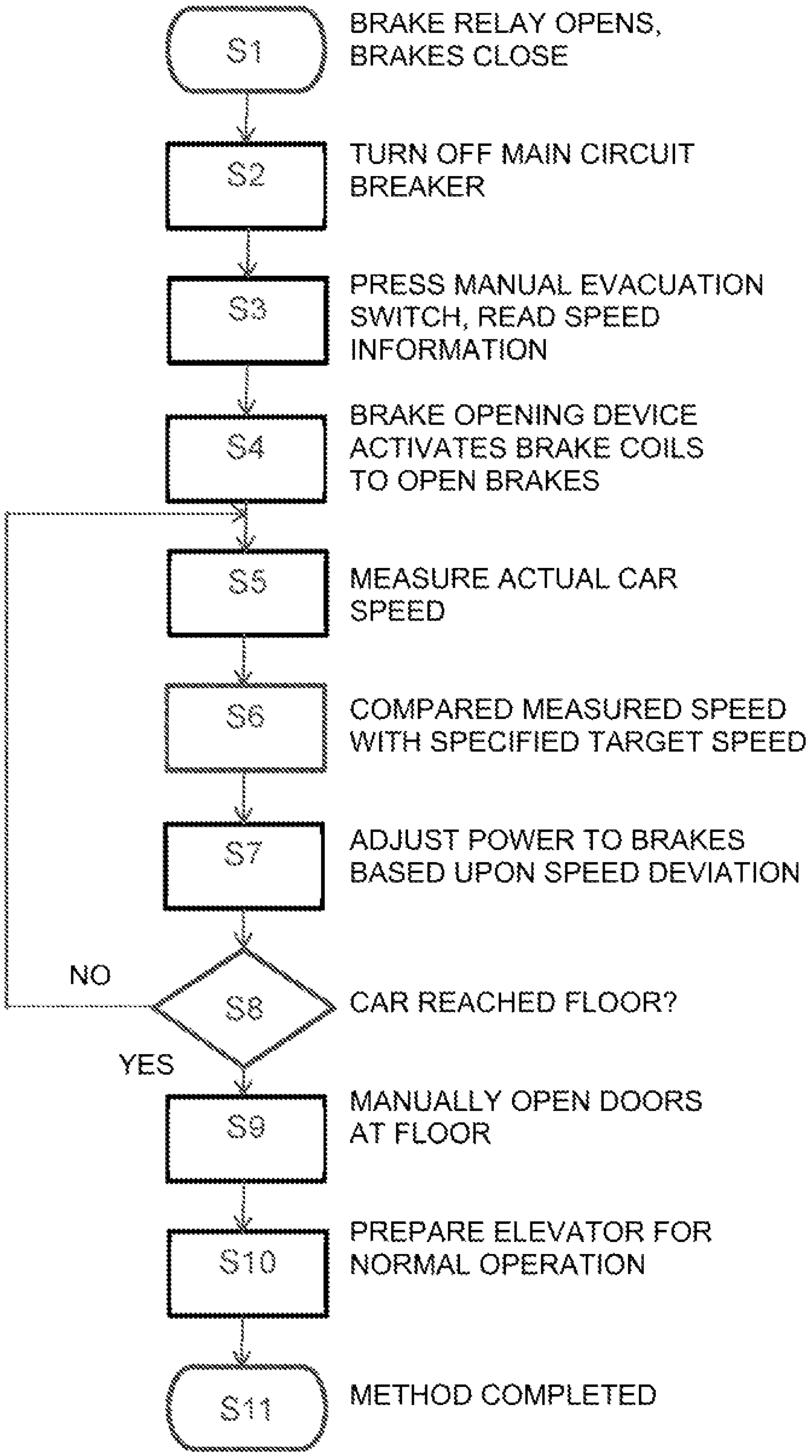
FIG. 7 shows a flowchart of a method according to the invention for moving an elevator car of an elevator in order to evacuate passengers from the elevator car in the event of a power failure.

FIG. 7 shows a flow chart of a method according to the invention for evacuating passengers from an elevator car who are stuck in the elevator car in the event of a power failure. Typically, such a method is carried out by a device from FIG. 6.

If the main energy supply fails in step S1, the brake contact or the brake relay BR is opened automatically and the brakes 14, 16 close immediately and thus prevent the elevator car 4 from continuing to move. If passengers are stuck in the elevator car 4, they can order the evacuation by actuating an emergency call switch.

Upon arrival, the service engineer will gain access to the control unit and turn off the main circuit breaker JH therein in step S2 to ensure that the evacuation method will not be interrupted even if the main energy supply is restored.

In step S3, the method is prepared by the brake opening device 60. It is ensured that the speed information can be read by the speed determination device. Also in step S3, the manual evacuation switch DEM is pressed by the service technician in order to connect the brake opening device 60 to the battery 52.

In step S4, the brake opening device 60 will then activate the brake coils 34 using a specific electrical power so that the elevator car 4 moves under the influence of gravitational force and depending on the imbalance between the mass of the car 4 and the counterweight 2. The brake is thus moved from a closed position to an at least partially open position in this step.

In order for the movement to take place at a constant speed, an actual speed of the elevator car is determined in step S5. This can be done by the encoder 26 and/or the magnetic tape 70 and the magnetic reader 68.

In a step S6, the measured actual speed is compared with a specified target speed. This takes place in the brake opening device 60. In other embodiments, this can also take place in another control device, for example in the elevator control device EC or in the motor control device MC.

In the next step S7, the electrical power transmitted to the brake is adjusted, i.e., reduced or increased, according to a deviation of the actual speed from a specified target speed, so that the actual speed substantially corresponds to the target speed.

If it is determined in step S8 that the car has reached a floor, the method proceeds to step S9. If no floor has yet been detected, the method jumps back to step S5 and runs through steps S5 to S7 again until it is then determined at a point in time that the floor has been reached.

If it is determined that the floor has been reached, the service technician can go to the corresponding floor in step S9 and open the doors of the elevator car there manually in order to evacuate the passengers.

In step S10, the elevator can subsequently be prepared again for normal operation. In step S11, the evacuation method is then completed.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for moving an elevator car of an elevator to evacuate passengers from the elevator car when a power failure occurs, wherein a brake blocks a vertical movement of the elevator car, the method comprising the steps of:

transmitting electrical power to the brake to release the brake and enable the vertical movement of the elevator car, the brake being adapted to move and be held in a plurality of positions ranging between a fully closed position and a fully open position according to the electrical power transmitted;

determining an actual speed at which the elevator car is moving;

comparing the determined actual speed with a predetermined target speed; and continuously modulating the transmitted electrical power causing the brake to adjust to the positions between the fully closed position and the fully open position so that the determined actual speed reaches and maintains the target speed.

2. The method according to claim 1 wherein continuously modulating the transmitted electrical power includes modulating a semiconductor switch that connects the brake to an electrical energy source.

3. The method according to claim 2 wherein the semiconductor switch is an insulated-gate bipolar transistor.

4. The method according to claim 1 including transmitting the electrical power to the brake as electrical pulses and modulating the transmitted electrical power by increasing or decreasing at least one of a pulse width, a pulse amplitude and a pulse frequency of the electrical pulses.

5. The method according to claim 4 wherein the electrical pulses are DC voltage pulses.

6. The method according to claim 4 wherein the electrical pulses are rectangular pulses.

7. The method according to claim 1 including starting the method steps in response to actuation of a manual evacuation switch.

8. The method according to claim 1 wherein the method steps of determining, comparing and adjusting are repeated during actuation of a manual evacuation switch.

9. The method according to claim 1 including ending the method steps when the car reaches a floor.

10. The method according to claim 1 including stopping the transmission of the electrical power to the brake when the determined actual speed exceeds a predetermined speed limit thereby causing the brake to close.

11. The method according to claim 1 including stopping the transmission of the electrical power to the brake when the determined actual speed falls below a predetermined speed limit thereby causing the brake to close.

12. A brake opening device for moving an elevator car of an elevator to evacuate passengers from the elevator car when a power failure occurs, wherein a brake blocks a vertical movement of the elevator car, the brake opening device comprising:

an electrical energy source for supplying electrical power to the brake;

a semiconductor switch connecting the brake to the electrical energy source; and a control device modulating the semiconductor switch to continuously modulate the transmitted electrical power in a closed-loop manner causing the brake to adjust to the positions between the fully closed position and the fully open position so that an actual speed of the elevator car reaches and maintains a target speed.

13. The brake opening device according to claim 12 including a speed determination device determining the actual speed of the elevator car.

14. The brake opening device according to claim 13 wherein the speed determination device includes at least one of an encoder and a magnetic reader on the elevator car reading a magnetic tape in a shaft in which the elevator car is moving.

15. An elevator for moving passengers, the elevator comprising:

an elevator car for receiving the passengers; and a brake opening device according to claim 12.

* * * * *